(12) United States Patent
Hulugundi et al.

(10) Patent No.: US 11,914,157 B2
(45) Date of Patent: Feb. 27, 2024

(54) ADJUSTABLE AIR COLUMNS FOR HEAD MOUNTED DISPLAYS

(71) Applicant: International Business Machines Corporation, Armonk, NY (US)

(72) Inventors: Jagadesh Ramaswamy Hulugundi, Bangalore (IN); Sarbajit K. Rakshit, Kolkata (IN); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 17/215,832

(22) Filed: Mar. 29, 2021

(65) Prior Publication Data
US 2022/0308353 A1    Sep. 29, 2022

(51) Int. Cl.
*G02B 27/01*  (2006.01)
*G06F 1/16*  (2006.01)
*H04R 17/00*  (2006.01)

(52) U.S. Cl.
CPC ....... *G02B 27/0176* (2013.01); *G06F 1/1605* (2013.01); *H04R 17/00* (2013.01); *H04R 2499/11* (2013.01); *H04R 2499/15* (2013.01)

(58) Field of Classification Search
CPC ...... G06F 1/163; G06F 1/1605; G06F 1/1688; G06F 1/1698; G06F 1/1681; G06F 1/1683; G06F 1/1684; H04R 17/00; H04R 17/02; H04R 17/06; H04R 17/10; H04R 1/00; H04R 1/02; H04R 1/021; H04R 1/025; H04R 1/026; H04R 1/028; H04R 1/10; G02B 27/01; G02B 27/017; G02B 27/0101; G02B 27/0149; G02B 27/0172; G02B 27/0176; G02B 27/0178
See application file for complete search history.

(56) References Cited

U.S. PATENT DOCUMENTS

| 7,590,249 | B2 | 9/2009 | Jang et al. |
| 10,326,978 | B2 | 6/2019 | Ostrover et al. |
| 2018/0003919 | A1* | 1/2018 | Song ..................... G06V 40/19 |
| 2018/0129112 | A1 | 5/2018 | Osterhout |
| 2018/0255386 | A1 | 9/2018 | Bristol et al. |
| 2019/0058938 | A1* | 2/2019 | Miller .................. H04R 1/1041 |

(Continued)

FOREIGN PATENT DOCUMENTS

| CN | 209330339 U | 8/2019 |
| CN | 106598245 B | 6/2020 |

(Continued)

OTHER PUBLICATIONS

Jrone et al., "17.5 Sound Interference and Resonance: Standing Waves in Air Columns—College Physics," OpenStax, Printed Mar. 25, 2021, 11 pages, https://openstax.org/books/college-physics/pages/17-5-sound-Interference-and-resonance-standing-waves-in-air-columns.

(Continued)

*Primary Examiner* — Sultan Chowdhury
(74) *Attorney, Agent, or Firm* — Jeffrey M. Ingalls

(57) ABSTRACT

A head mounted display device includes a frame with multiple tubes inside the frame. The tubes contain a number of speakers and valves. The valves can be actuated on demand, changing the air column length relative to the speakers. Based on an input sound, speakers can be selected and valves can be actuated to improve sound quality.

20 Claims, 6 Drawing Sheets

(56) References Cited

U.S. PATENT DOCUMENTS

2019/0297421 A1    9/2019  Beltran et al.
2019/0342647 A1*  11/2019  Mehra .................... H04R 17/00

FOREIGN PATENT DOCUMENTS

TW       201924362 A    6/2019
WO     2019059716 A1    3/2019

OTHER PUBLICATIONS

"Speed of Sound—Resonance Tube," Arizona State University Physics Labs, Mechanics, Printed Mar. 24, 2021, 5 pages, https://www.webassign.net/labsgraceperiod/asucolphysmech11/lab_10/manual.html.

Sanmartin et al., "Progress on the development of active microstructured optical arrays for X-ray optics," Research Gate, Proceedings of SPIE—The International Society for Optical Engineering, Aug. 2009, 11 pages, https://www.researchgate.net/publication/252956070_Progress_on_the_development_of_active_microstructured_optical_arrays_for_X-ray_optics.

Abbott, David, "Vibrating Air Columns—Understanding Sound," Printed Mar. 28, 2021, 10 pages, Pressbooks Simple Book Publishing, https://sound.pressbooks.com/chapter/vibrating-air-columns/.

* cited by examiner

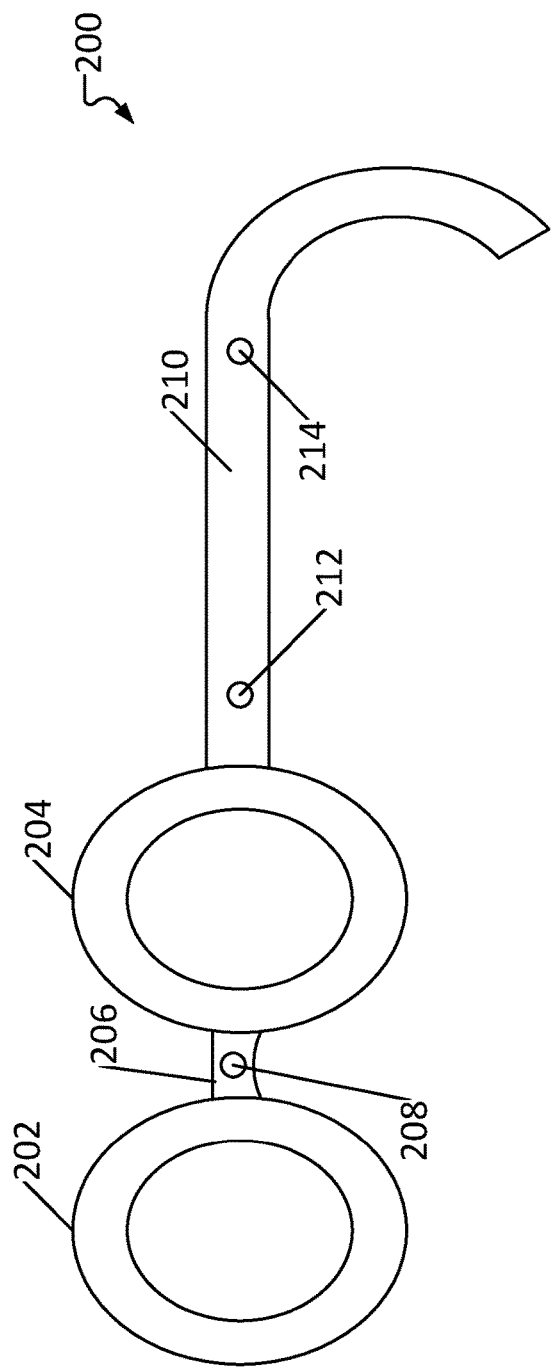
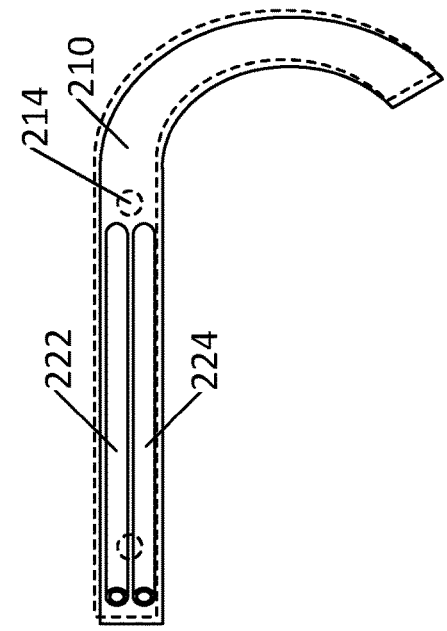
FIG. 2A
FIG. 2B

ADJUSTABLE AIR COLUMNS FOR HEAD MOUNTED DISPLAYS

BACKGROUND

The systems and methods of the present disclosure relate to head mounted displays.

Head mounted displays can provide for several kinds of user experience such as, for example, augmented reality (AR) or virtual reality (VR).

"Air column" is a term referring to a volume of air often used in the context of acoustics. Air columns can be described by their shape and dimensions. Air columns are often (but not necessarily) cylinder-shaped, having a diameter and a length. Sound waves propagate through air columns based in part on the air column length. For example, increased air column length results in increased resonance of the sound wave, which can be utilized to increase the volume of the sound. Other aspects of acoustics can also be affected by the dimensions and shape of the air column such as, for example, noise factor (a ratio of a signal-to-noise ratio at input to signal-to-noise ratio at output) and echo quality.

SUMMARY

Some embodiments of the present disclosure can be illustrated as a method. The method comprises receiving input sound to be played from a head mounted display device. The method further comprises determining, based on the input sound, air column lengths. The method further comprises selecting speakers to emit sound. The speakers are selected based on the input sound and the air column lengths. The method further comprises controlling an actuation state for each of a set of valves within tubes. The controlling is based on the input sound and the air column lengths. The method further comprises causing the selected speakers to emit sound based on the input sound.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

FIG. 2A is a diagram of an example head mounted display device including audio output holes and adjustable air columns, consistent with several embodiments of the present disclosure.

FIG. 2B is a cross-section of an example head mounted display device including audio output holes and speaker tubes having adjustable air column lengths, consistent with several embodiments of the present disclosure.

Figure 1:
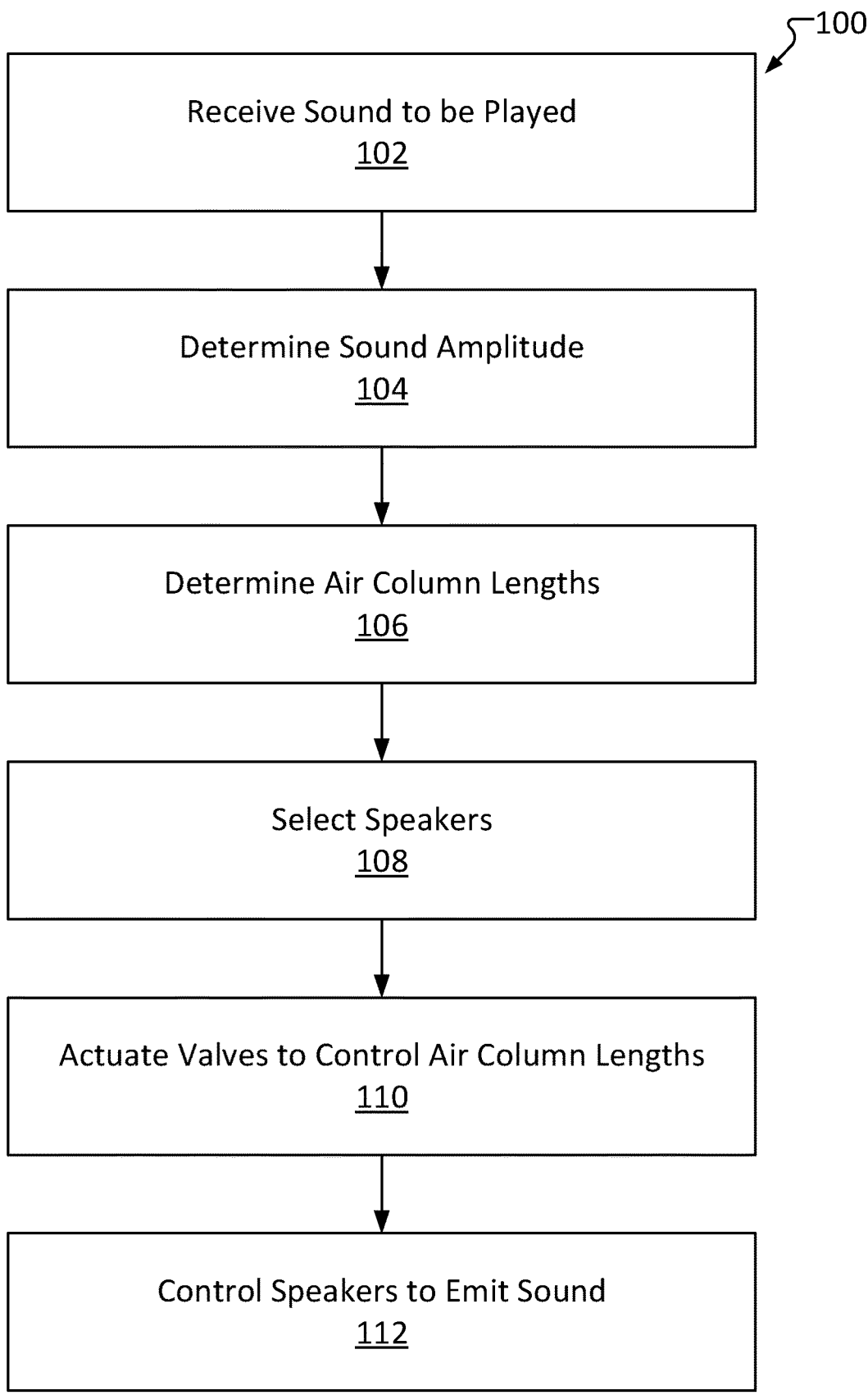
FIG. 1 is a high-level method for adjusting air column lengths of a head mounted display device, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to providing improved directional sound output via a head mounted device. More particular aspects relate to a system to receive a sound input, select a set of speakers, determine air column lengths based on the input and the speakers, and control activation states of a set of valves based on the air column lengths.

Head mounted display devices, such as augmented reality headsets and virtual reality headsets, are faced with a challenge of balancing portability with features such as audio quality. For example, designers of head mounted display devices generally try to minimize weight and bulk of devices in order to improve user experience. However, this often comes at a cost of features such as sound quality, structural integrity, battery life, etc. This can happen because, for example, higher-quality speakers and materials are often either heavier or more expensive. Further, typical design techniques to improve audio quality (such as adding additional speakers or improving travel distance of speaker drivers) add bulk to a design.

"Sound," as used herein, can be interpreted as having components and subcomponents. As used herein, a "sound" refers to audio that an emitter device (such as a headset including a set of speakers) emits. As an example, ambient noise of a forest, as emitted by a speaker, may be considered a "sound." Ambient forest sound might include "leaves rustling" as a first sound component and "branch breaking"

as a second sound component. Each component may be comprised of subcomponents in order to produce a relatively realistic listener experience. For example, the "leaves rustling" component may be intended to originate from the user's left. Thus, the leaves rustling component may include a first subcomponent to be emitted by a first group of speakers to the left of the listener. However, in order to produce a more immersive experience, the component may also include a second subcomponent to be emitted by a second group of speakers in front of the listener, and a third subcomponent to be emitted by a third group of speakers behind the listener. The second and third subcomponents may be emitted with a lesser magnitude (i.e., quieter) relative to the first subcomponent, but their presence may assist in immersing the listener.

Sound emitted (such as by a speaker) is affected by the volume of air that the sound waves are emitted into (often referred to as an "air column"). For example, a "resonance factor" n describes a number of full wavelengths of the sound wave that are able to fit within an air column. In general, larger values of n correspond to louder sound. For example, a sound emitted into a first air column may have a resonance factor of n=2, while the same sound (i.e., same frequency and wavelength) emitted into a second, longer air column may have a resonance factor of n=3. In such an example, the second sound will be perceived as louder than the first sound due to the increased resonance.

For a sound with a given wavelength k, the resonance factor n of the sound in an air column having an air column length L is governed by Equation 1, below:

$$L_n = \frac{(2n+1)}{4}\lambda \quad (1)$$

The dimensions of an air column into which a speaker emits sound can be controlled by placing the speaker into a tube (a "speaker tube") with pre-determined dimensions. This way, the dimensions of the tube can function as the dimensions of the air column. For example, an inner diameter of the tube is a diameter of the air column, and a length of the tube is a length of the air column. Some devices have included speaker within tubes within a hollow frame of a device. However, such tubes have a fixed air column length. As acoustics of the sound produced by the speaker (such as resonance factor, noise factor, echo quality, etc.) depend in part on the dimensions of the air column, the fixed nature of the speaker tubes limits the variety of sounds that can be produced.

Systems and methods consistent with the present disclosure enable head mounted display devices with embedded speaker tubes that have variable-length air columns. This may be accomplished using multiple speakers in each tube, along with programmatically controlled valves within the tubes. The valves can be actuated on demand via a computer control system. The computer control system may be or include an onboard system within the device or may be a separate, remote device. Each valve can be in an "open" state or a "closed" state, and can be actuated to change between states. When open, the valves allow air and sound to flow freely. When closed, the valves obstruct movement of air, functionally shortening an air column.

Desired sound output can be produced from specific speakers via similar programmatic controls. As an example, a device may include two tubes and four speakers, wherein each tube includes two speakers. The device may receive a sound input. Based on the sound input, the device may select speakers from the four speakers to emit sound. For example, the device may select a second speaker and a third speaker to emit sound based on the input sound. The speakers may be selected based on, for example, a direction that the sound is intended to appear to be emanating from (e.g., behind the user), a desired volume of the sound, etc. Combining the valve actuation with selective utilization of the speakers, more dynamic and higher-quality sound output can be realized.

FIG. 1 is a high-level method 100 for adjusting air column lengths of a head mounted display device, consistent with several embodiments of the present disclosure. Method 100 comprises receiving a sound to be played at operation 102. Operation 102 may include, for example, receiving an input sound from an application, such as a VR application executing on a head mounted device. For example, operation 102 may include receiving sounds from an AR device such as a branch breaking and leaves rustling in wind. Operation 102 may further include receiving directional information (i.e., information regarding direction of the sound). In some instances, operation 102 may include receiving information from one or more external devices such as, for example, additional VR or AR devices.

Method 100 further comprises determining sound amplitudes at operation 104. Operation 104 may include, for example, identifying a desired amplitude of particular components of the sound received at operation 102. For example, a sound of leaves rustling may have a relatively quiet desired amplitude, while a sound of a branch breaking may have a relatively loud desired amplitude. Operation 104 may include determining amplitudes of subcomponents of sound based on direction and other acoustics (such as reverberation, echo, etc.). For example, received sound input may indicate that leaves are rustling at an amplitude of 15 decibels (dB) and that the leaves-rustling sound is originating directly behind the user (such as in an augmented reality environment simulating a forest). Operation 104 may include determining that, in order to accurately simulate the sound to the user, a first subcomponent of the leaves-rustling sound should be played at 10 dB directly behind the user, a second subcomponent of the leaves-rustling sound should be played at 7 dB to the user's left, and a third subcomponent of the leaves-rustling sound should be played at 7 dB to the user's right. This way, the three subcomponents of the leaves-rustlings sound, when played together, will more accurately reproduce the intended sound in the simulated environment.

Method 100 further comprises determining air column lengths at operation 106. Operation 106 may include, for example, calculating air column lengths corresponding to the amplitudes determined at operation 104. For each subcomponent of a sound to be emitted, an air column length may be calculated based on an amplitude and a wavelength of the subcomponent of the sound. For example, a sound subcomponent may have an amplitude (determined at operation 104) of 10 dB and a wavelength of 2 centimeters (cm). Due to the relatively high amplitude of 10 dB, a resonance factor of n=2 may be selected. Using Equation 1, this results in an air column length of $$L_2 = \frac{(2*2+1)}{4} * 2 \text{ cm} = 2.5 \text{ cm}.$$

The air column length determined via Equation 1 may be an "ideal" air column length, representing a best-case scenario. A system performing method 100 may attempt to achieve this ideal air column length where possible.

Method 100 further comprises selecting speakers at operation 108. Operation 108 may include, for example, selecting speakers from a set of available speakers to emit the sound. Multiple speakers may be selected in order to emit subcomponents of components of the sound.

Speaker selection may be based on position of each of the set of available speakers. For example, a device may include twelve speakers. A sound received at operation 102 may include a "leaves rustling" component originating from the listener's left and a "branch breaking" component originating from behind the listener. Operation 108 may include selecting a first speaker on the user's left and a second speaker behind the user to emit subcomponents of the "leaves rustling" component. Further, operation 108 may include selecting the second speaker and a third speaker to the user's right to emit subcomponents of a "branch breaking" component. Emitting subcomponents of a sound from multiple directions at differing amplitudes can produce a relatively immersive and/or realistic listening experience. In some instances, speakers may be within tubes which are in turn within a hollow frame of the device, wherein sound exits the tube and the hollow frame via one or more "audio output holes." Thus, in some instances, speakers may be selected based upon positions of audio output holes that are associated with the speakers. For example, the first speaker may emit sound that exits the frame via both a first audio output hole to the listener's left and a second audio output hole behind the user.

Speaker selection may be based on frequency response of each of the set of available speakers. Some speakers may be better suited to emitting particular sounds than others. For example, an input sound may include a "rockfall" component, which may be relatively bass-heavy (i.e., includes subcomponents at relatively low frequencies, such as 40 Hz). A fourth speaker and a fifth speaker (of the twelve example speakers described above) may both be positioned within the device appropriately to recreate the appropriate direction of the source of the rockfall sound component (e.g., the rockfall may be directly in front of the listener, and the fourth and fifth speakers may both be in front of the listener as well). However, the fourth speaker may be a mid-range "tweeter" best suited to emit sounds with frequencies between 2,000 Hz and 10,000 Hz, while the fifth speaker may be a "woofer" best suited to emit sounds with frequencies between 30 Hz and 500 Hz. In such an example, operation 108 may include selecting the fifth speaker to emit subcomponents of the rockfall sound.

The various speakers of the device may be within speaker tubes. Therefore, operation 108 may include selecting speakers based in part upon the tubes the speakers are in and in part upon the air column length determined at operation 106. For example, the input sound may include a "trickling water" component. A sixth speaker and a seventh speaker may be equally suited to emit a subcomponent of the "trickling water" component in terms of frequency response and direction. However, the sixth speaker may be within a first tube and the seventh speaker may be within a second tube. The sixth tube may have an air column length of 4 cm and the seventh tube may have an air column length of 3 cm. Further, the sixth tube may include a valve which, when closed, may change the air column length of the sixth speaker from 4 cm to 2.5 cm, while the seventh tube may have a valve which, when closed, may change the air column length of the seventh speaker from 3 cm to 2 cm. Based on the air column length of 2.5 cm (determined at operation 106) and assuming all other considerations (frequency range, direction, etc.) are equivalent between the sixth speaker and the seventh speaker for a given subcomponent, operation 108 may include selecting the sixth speaker to emit the subcomponent of the "trickling water."

Method 100 further comprises actuating valves to control air column lengths at operation 110. Operation 110 may include, for example, controlling an actuation state (i.e., open or closed) of each of a set of valves. For example, the example sixth speaker described above may be within a sixth tube such that an air column length of the sixth speaker is 4 cm. However, the air column length determined at operation 106 may be 2.5 cm, and the sixth tube includes a valve which, when closed, results in the sixth speaker having an air column length of 2.5 cm. Thus, operation 110 may include closing the valve within the sixth tube, causing the sixth speaker to have the desired air column length. The actuation state may be controlled via supplying an electric current to one or more piezoelectric valves to cause the valves to open and/or close. The valves and their impact on air column length is described in further detail below with reference to FIG. 3B.

Method 100 further comprises causing speakers to emit sound at operation 112. Operation 112 may include, for example, supplying electric current to the speakers selected at operation 108 to cause them to emit sound according to the input sound received at operation 102. For example, a device including twelve speakers may receive an input sound at operation 102 including a "leaves rustling" component, a "branch breaking" component, a "rockfall" component, and a "water trickling" component. Each component may include multiple subcomponents, although for the sake of brevity, only subcomponents of the "leaves rustling" and "branch breaking" components are discussed in this example; the "rockfall" component and the "trickling water" component are described as if they can be accurately recreated by a single speaker. In this example, operation 112 may include causing the first speaker to emit the first subcomponent of the "leaves rustling" component of the input sound, causing the second speaker to emit the second subcomponent of the "leaves rustling" component as well as the first subcomponent of the "branch breaking" component, causing the third speaker to emit the second subcomponent of the "branch breaking" component, causing the fifth speaker to emit the "rockfall" component, and causing the sixth speaker to emit the "trickling water" component. This may result in an acoustic representation of an environment, such as a virtual or augmented reality environment. In particular, due to the valve in the sixth speaker tube being closed, the sixth speaker may produce the "trickling water" sound with a desired air column length, resulting in a more realistic sound.

In some instances, an ideal air column length may not be achievable by a given device; for example, an air column length determined via Equation 1 may be 1.7 cm, which may not be achieved via any combination of speaker selection and valve actuation state. In such instances, a closest match may be selected (e.g., a 2 cm air column length may be selected over a 2.5 cm air column length, as 2 cm is closer to 1.7 cm than 2.5 cm is). Where two air column length options are roughly equivalent in terms of proximity to an ideal air column length (e.g., if the ideal air column length is 2.50 cm, and a first option yields a 2.02 cm air column length while a second option yields a 3.01 cm air column length), a system performing method 100 may turn to user preferences to "break the tie." For example, a user may generally prefer louder bass sounds. Thus, if the ideal air column length for a bass-heavy sound (such as a rockfall) is 2.50 cm but 2.50 cm is not achievable, the system may select a 3.01 cm air column length over a 2.02 cm air column length, as the increased bass may be preferable to the user.

User preferences can be determined over time based on user input. For example, a user may directly input preferences such as "prefer louder bass over quieter bass." In some instances, a system may learn user preferences over time based on user volume adjustments; for example, the system may detect that a user increased or decreased output volume in response to a sound being played.

FIG. 2A is a diagram of an example head mounted display device 200 including audio output holes and adjustable air columns, consistent with several embodiments of the present disclosure. Device 200 includes eyepiece 202 and eyepiece 204, connected by bridge 206. In some embodiments, eyepieces 202 and 204 and bridge 206 may be a singular component. Device 200 also includes frame 210. Device 200 includes a set of speakers (not visible in FIG. 2A) within frame 210. The speakers within frame 210 are configured to emit sound, which is able to exit from frame 210 (and thus be heard by a listener/user of device 200) via audio output holes 208, 212, and 214. More specifically, frame 210 includes a set of speaker tubes (depicted in FIG. 2B), wherein the speaker tubes include one or more speakers (as depicted in FIG. 3B, below). The speaker tubes are each connected to at least one audio output hole, such that a sound wave emitted by any speaker(s) within each tube eventually exits through an audio output hole.

FIG. 2B is a cross-section of head mounted display device 200 including audio output holes and adjustable air columns, consistent with several embodiments of the present disclosure. As seen in FIG. 2B, frame 210 includes multiple speaker tubes such as speaker tube 222 and speaker tube 224. Speaker tubes 222, 224 include one or more speakers (not visible in FIG. 2B, but depicted in FIG. 3B and discussed in further detail below) as well as programmatically controlled valves, enabling device 200 to dynamically adjust a length of an air column for the speakers that are within tubes 222, 224. Adjusting air column length enables adjusting a resonance factor of sounds emitted by the speakers that are within tubes 222, 224, which in turn enables a wider range of sound output. Tubes 222, 224 may be connected to one or more audio output holes such as audio output hole 214. In some embodiments, tubes 222, 224 may be interconnected. In some embodiments, additional tubes may be included. Speaker tubes similar to tubes 222, 224 may be included within other components of device 200, such as, for example, eyepieces 202, 204, bridge 206, etc.

Figure 3A:
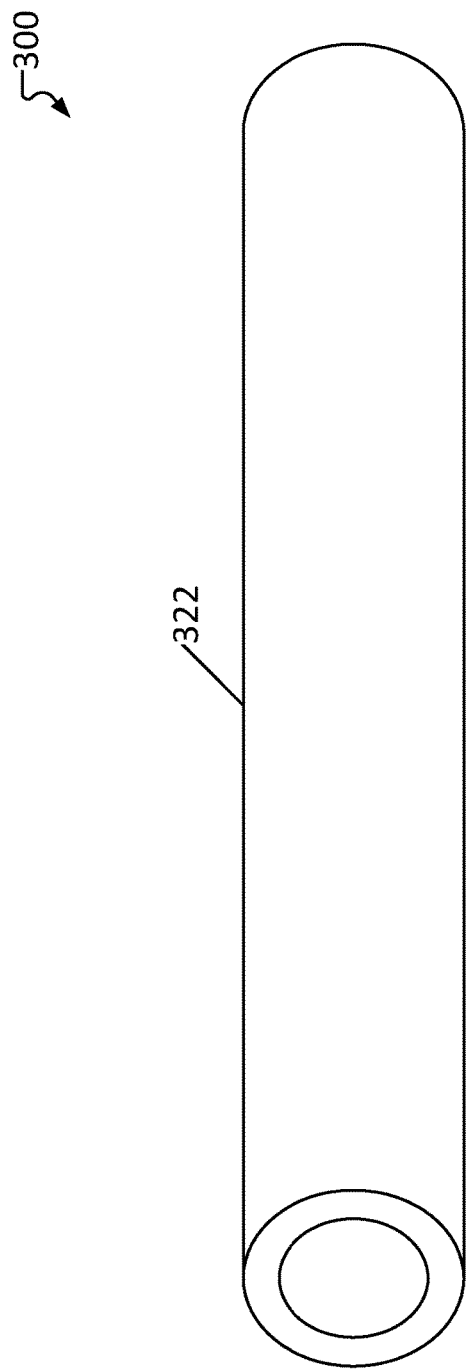
FIG. 3A is a diagram of an example speaker tube having an adjustable air column length within a head mounted display device, consistent with several embodiments of the present disclosure.
Figure 3B:
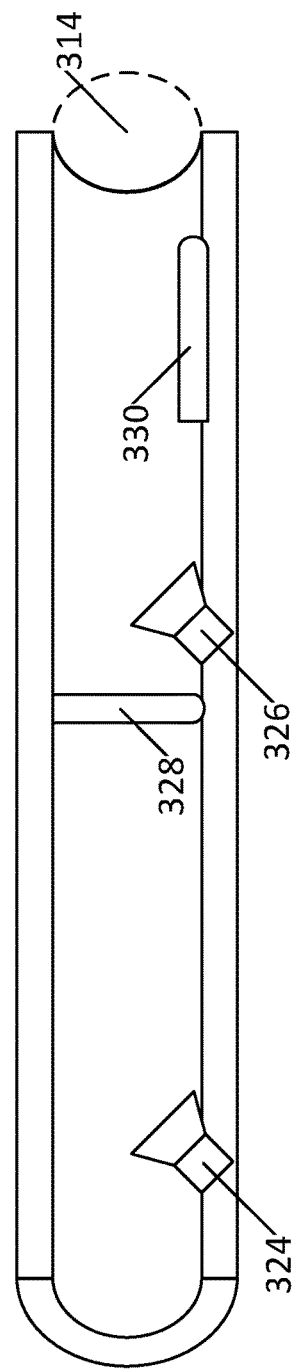
FIG. 3B is a cross-section of an example speaker tube having an adjustable air column length within a head mounted display device, consistent with several embodiments of the present disclosure.

FIG. 3A is a diagram of an example speaker tube 322 having an adjustable air column length within a head mounted display device, consistent with several embodiments of the present disclosure. Tube 322 may be included with a device such as, for example, device 200 of FIG. 2. While tube 322 is depicted as straight and cylindrical, in some embodiments, tube 322 may be bent, curved, fluted, or otherwise irregular in shape.

FIG. 3B is a cross-section of an example speaker tube 322 having an adjustable air column length within a head mounted display device, consistent with several embodiments of the present disclosure. As shown in FIG. 3B, tube 322 includes speaker 324 and speaker 326, as well as valve 328 and valve 330. Valve 328 is depicted in a "closed" state, meaning an air column of speaker 322 may be shortened (relative to the air column of speaker 322 when valve 328 is "open"). The shorter air column results in a reduced resonance (i.e., reduced amplitude) factor of sounds emitted by speaker 322.

Figure 3C:
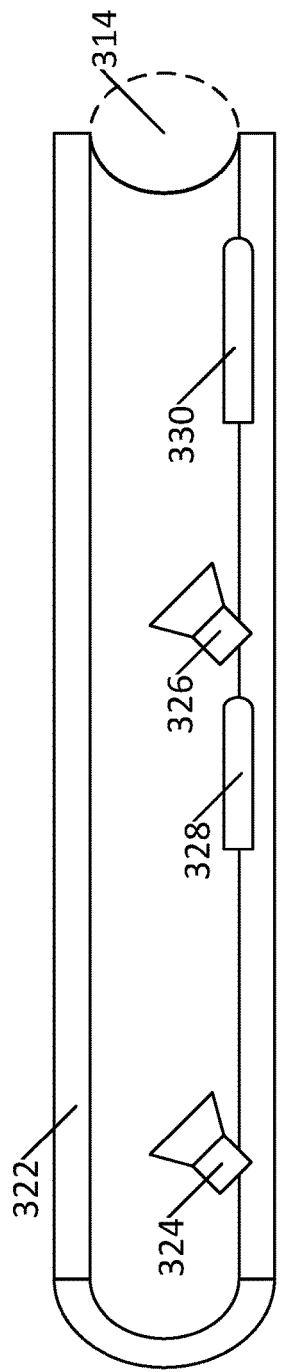
FIG. 3C is a cross-section of an example speaker tube having an adjustable air column length within a head mounted display device in an open configuration, consistent with several embodiments of the present disclosure.

Speakers 322, 324 can be controlled to be active or inactive depending upon user settings and/or input sound. Similarly, valves 328 and/or 330 can be controlled to be "open" or "closed" depending upon user settings and/or input sound. For example, depending upon a sound to be emitted, neither, either, or both of speakers 324, 326 may be active. In one instance, speaker 324 may be configured to emit sound while both of valves 328 and 330 are in an "open" position, resulting in a relatively long air column for speaker 324 (and thus a high resonance factor for sound emitted by speaker 324. This instance is depicted in FIG. 3C for reference. In another instance, speaker 324 may be configured to emit sound with valve 328 open and valve 330 closed, resulting in a shorter air column length for speaker 324 (and thus a lower resonance factor for sound emitted by speaker 324). In another instance, both speaker 324 and 326 may be configured to emit sound with both valves 328, 330 closed, resulting in minimum air column lengths for both speaker 324 and 326 (and thus a minimum resonance factor for sound emitted by speaker 324 and sound emitted by speaker 326). Thus, multiple configurations of different speakers and different air column lengths can be achieved, greatly increasing dynamic adjustability of a head mounted display device. As shown in in FIG. 3B, tube 322 may end at audio output hole 314, such that sound emitted from speaker 324 and/or speaker 326 may exit tube 322 via audio output hole 314.

As speakers 324, 326 may be lightweight and wirelessly controlled, their impact on weight and complexity of the device may be minimal. Further, valves 328, 330 may be piezoelectric valves, enabling simple, reliable control. Additionally, piezoelectric valves may be beneficially quiet when actuating.

FIG. 3C is a cross-section of an example speaker tube 322 having an adjustable air column length within a head mounted display device in an open configuration, consistent with several embodiments of the present disclosure. Compared to FIG. 3B, tube 322 is depicted in FIG. 3C as having both valve 328 and 330 open, resulting in maximum air column lengths for both speaker 324 and speaker 326. This may be preferable if, for example, speaker 324 and/or speaker 326 are selected to emit sound that has a relatively high amplitude. As shown in in FIG. 3C, tube 322 may end at audio output hole 314, such that sound emitted from speaker 324 and/or speaker 326 may exit tube 322 via audio output hole 314.

Figure 4:
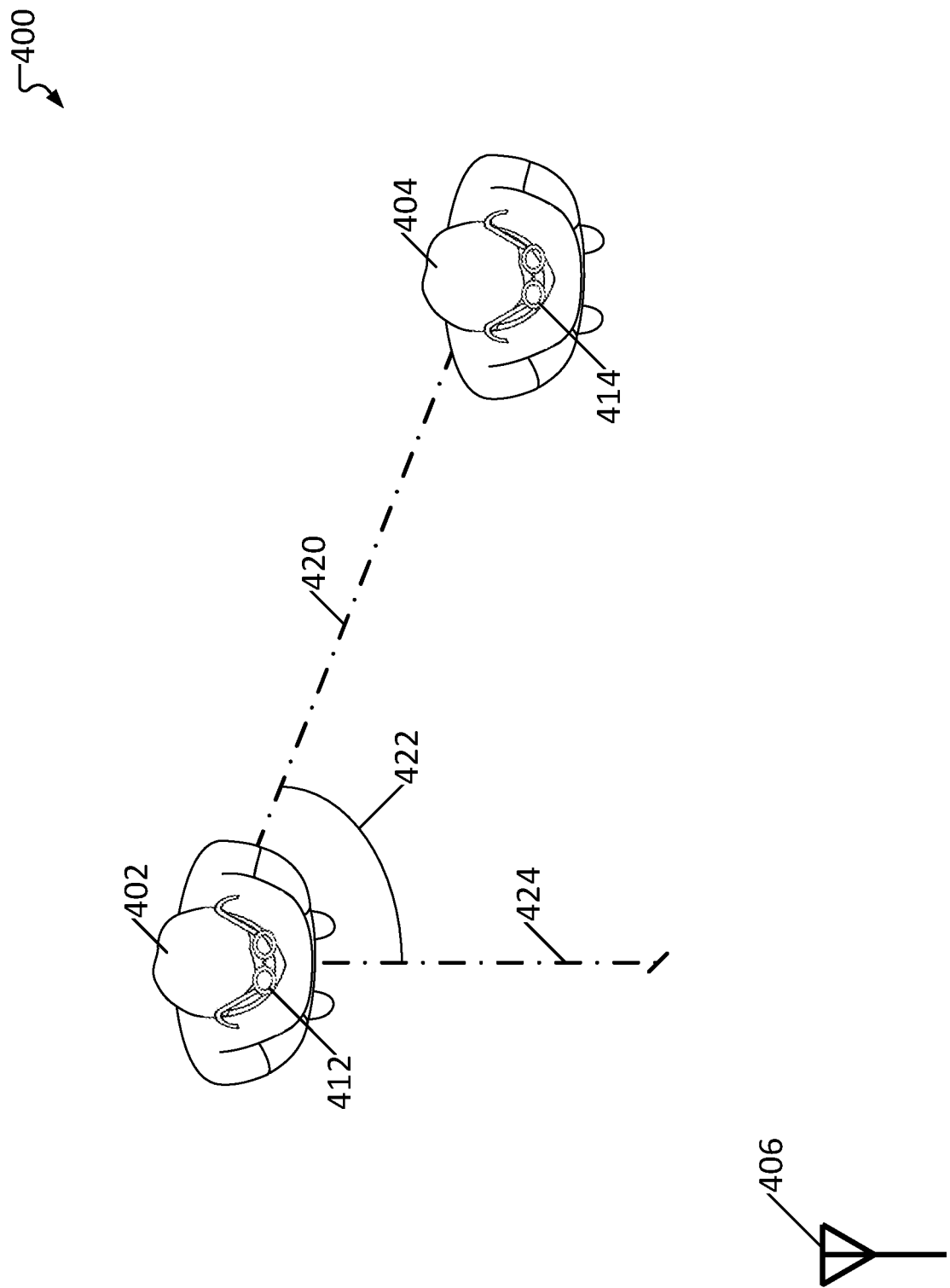
FIG. 4 is a diagram of an example multi-user environment including several devices enabling a shared experience consistent with the present disclosure.

FIG. 4 is a diagram of an example multi-user environment 400 including several devices 412, 414 enabling a shared experience, consistent with the present disclosure. Multi-user environment 400 includes first user 402 wearing first device 412 and second user 404 wearing second device 414. One or both of devices 412 and 414 may be a head mounted display (such as an augmented reality (AR) or virtual reality (VR) headset) with adjustable air columns for speakers such as, for example, device 200 described with reference to FIG. 2, above. Device 412 may be configured to identify that device 414 is in relatively close proximity (via, for example, wireless communication protocols such as Wi-Fi, Bluetooth®, etc.). Device 414 may be similarly configured to identify that device 412 is in relatively close proximity. Further, device 412 may be configured to determine a position of user 404 relative to user 402. This position may be determined based on, for example, a distance 420 between device 412 and device 414, as well as a direction of device 414 (e.g., an angle 422 from a forward axis 424) relative to device 412. Device 412 may be configured to emit sound based in part upon user 404's actions and position.

In some instances, device 412 may emit sound based upon an activity user 404 is engaged in. For example, user 404 may be utilizing device 414 to perform a virtual concert in VR, while user 402 may be utilizing device 412 to perform a related activity, such as attending the virtual concert or performing the virtual concert as well. In such an example, device 412 may emit directional sound based upon user 404's actions (such as playing a virtual instrument), which can improve immersion in user 402's virtual experience. For example, user 404 may move around multi-user environment 400 while performing in the virtual concert. As device 412 can monitor a position of device 414 (and therefore of user 404), device 412 can adjust directional sound emitted for user 402 based upon user 404's movements. For example, user 404 may initially be standing to user 402's left while playing a virtual instrument, so device 412 may emit sound based upon user 404's playing to simulate that the sound is coming from user 402's left. User 404 may then move directly in front of user 402 and continue playing, so device 412 may select speakers/air column lengths, etc., to emit sound based upon user 404's playing to simulate that the sound is coming from in front of user 402.

In some instances, device 412 may determine a direction that user 404 is facing in addition to a direction that user 402 is facing, leveraging this information to adjust sound output. For example, user 404 may be playing a virtual instrument while facing away from user 402, so device 412 may emit sound to user 402 in a slightly muffled or otherwise distorted manner to represent to user 402 that user 404's body is in between user 404's virtual instrument and user 402. In contrast, user 404 may be playing the virtual instrument while directly facing user 402, so device 412 may emit sound to user 402 in an amplified or otherwise boosted manner. Device 412 may determine the direction that user 404 is facing based upon received data from device 414. In some instances, one or both of devices 412 and 414 may be in communication with a third device 406, such as a virtual reality base station, which may assist in performing tasks related to enabling a shared user experience such as monitoring positions and orientations of users 402 and 404 relative to one another and relative to multi-user environment 400. Additional users and devices may also be supported.

In some instances, device 412 may emit a warning sound to user 402 if user 402 is in danger of coming into contact with user 404, third device 406, or something else in multi-user environment 400. In some instances, the warning sound may be directional, based upon a direction of the obstacle relative to user 402. Further, in some instances, device 412 may emit a warning sound if user 402 approaches or exits a designated area, such as a VR boundary. Similarly, the warning sound may be directional. For example, the warning sound may be emitted to appear to user 402 as if the boundary is emitting the sound (e.g., a "stay away" message), as if the center of multi-user environment 400 is emitting the sound (e.g., a "come back" message), etc.

In some instances, device 412 may emit sound even if user 402 is engaging in an unrelated activity. For example, user 404 may be utilizing device 414 to perform a virtual concert in VR, while user 402 may be utilizing device 412 to play a game in VR unrelated to the virtual concert. In such an example, device 412 might emit sound from user 404's virtual concert. In some instances, the sound might be muffled, reduced in volume, or otherwise distorted to simulate to user 402 that the virtual concert is relatively far from user 402. This might enable user 402 and user 404 to impact one another's VR experience and therefore subtly interact with each other even when the users are engaged in unrelated activities. Such interaction can be subject to user preferences; for example, user 402 may disable sound from other devices (i.e., device 414) to allow user 402 to be more fully immersed in an activity that user 402 is engaged in. For example, if user 402 is viewing a calm virtual forest environment via device 412 while user 404 is engaged in a relatively loud virtual rock concert, user 402 may not wish to hear music from user 404's activity, and thus user 402 may disable, dismiss, mute, or otherwise opt out of shared experience functionality. In some instances, such functionality may be "opt-in" instead; for example, user 402 may be presented with a notification that user 404 is engaged in an activity nearby, prompting user 402 to accept or reject a shared experience.

Figure 5:
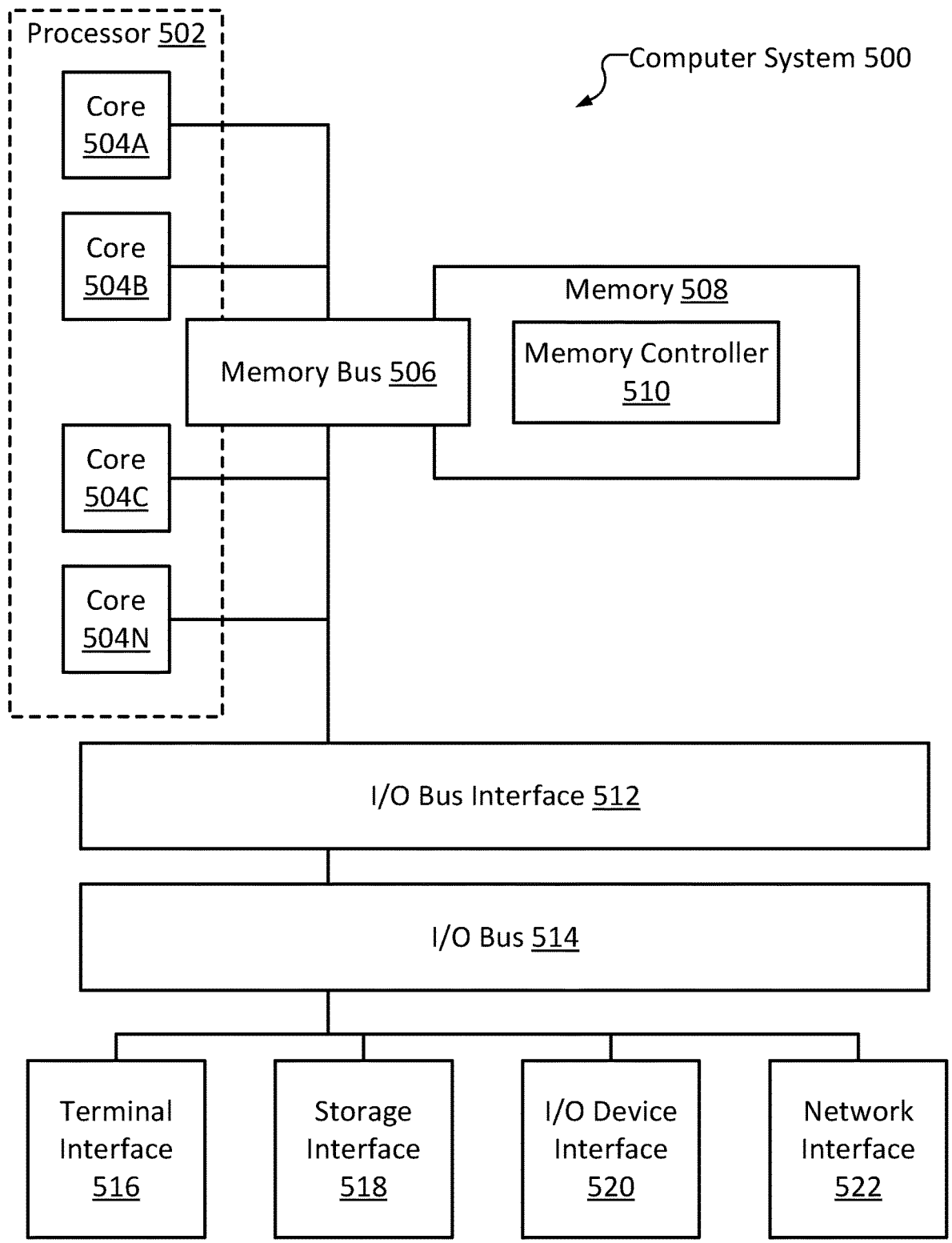
FIG. 5 is a high-level block diagram of an example computer system that may be used in implementing embodiments of the present disclosure.

Referring now to FIG. 5, shown is a high-level block diagram of an example computer system 500 that may be configured to perform various aspects of the present disclosure, including, for example, methods 200 and 300. The example computer system 500 may be used in implementing one or more of the methods or modules, and any related functions or operations, described herein (e.g., using one or more processor circuits or computer processors of the computer), in accordance with embodiments of the present disclosure. In some embodiments, the major components of the computer system 500 may comprise one or more CPUs 502, a memory subsystem 508, a terminal interface 516, a storage interface 518, an I/O (Input/Output) device interface 520, and a network interface 522, all of which may be communicatively coupled, directly or indirectly, for inter-component communication via a memory bus 506, an I/O bus 514, and an I/O bus interface unit 512.

The computer system 500 may contain one or more general-purpose programmable processors 502 (such as central processing units (CPUs)), some or all of which may include one or more cores 504A, 504B, 504C, and 504N, herein generically referred to as the CPU 502. In some embodiments, the computer system 500 may contain multiple processors typical of a relatively large system; however, in other embodiments the computer system 500 may alternatively be a single CPU system. Each CPU 502 may execute instructions stored in the memory subsystem 508 on a CPU core 504 and may comprise one or more levels of on-board cache.

In some embodiments, the memory subsystem 508 may comprise a random-access semiconductor memory, storage device, or storage medium (either volatile or non-volatile) for storing data and programs. In some embodiments, the memory subsystem 508 may represent the entire virtual memory of the computer system 500 and may also include the virtual memory of other computer systems coupled to the computer system 500 or connected via a network. The memory subsystem 508 may be conceptually a single monolithic entity, but, in some embodiments, the memory subsystem 508 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 508 may contain elements for control and flow of memory used by the CPU 502. This may include a memory controller 510.

Although the memory bus 506 is shown in FIG. 5 as a single bus structure providing a direct communication path among the CPU 502, the memory subsystem 508, and the I/O bus interface 512, the memory bus 506 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 512 and the I/O bus 514 are shown as single respective units, the computer system 500 may, in some embodiments, contain multiple I/O bus interface units 512, multiple I/O buses 514, or both. Further, while multiple I/O interface units are shown, which separate the I/O bus 514 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A head mounted display device, comprising:
a frame, the frame including a set of tubes;
a set of speakers within the tubes;
a memory; and
a processor coupled to the memory, the processor configured to:
    receive input sound to be played from the head mounted display device;
    determine, based on the input sound, an amplitude of a component of the input sound to be played by one of the set of speakers;
    determine, based on the amplitude, an air column length for playback of the component;
    select, based on the input sound and the air column length, a speaker of the set of speakers to emit the component;
    control, based on the selected speakers and the air column lengths, an actuation state for each of a set of valves within the tubes to control a selected air column length of each of the selected speakers; and
    cause the selected speakers to emit sound based on the input sound.

2. The head mounted display device of claim 1, wherein the valves are piezoelectric valves.

3. The head mounted display device of claim 1, further comprising a set of audio output holes distributed across the frame.

4. The head mounted display device of claim 3, wherein the selecting is based further on locations of the audio output holes.

5. The head mounted display device of claim 1, wherein:
the input sound includes directional information; and
the selecting is based further on the directional information and a frequency response of each of the set of speakers.

6. The head mounted display device of claim 1, wherein the processor is further configured to:
identify a second device; and
receive external sound data from a second device, wherein the input sound includes the external sound data.

7. The head mounted display device of claim 6, wherein:
the processor is further configured to determine a position of the second device; and
the selecting is based further on the position of the second device.

8. The head mounted display device of claim 6, wherein the processor is further configured to:
provide, responsive to the identifying, a notification to a user of the head mounted display device; and
receive a user input, wherein the input sound including the external sound data is based on the user input.

9. A method, comprising:
receiving input sound to be played from a head mounted display device;
determining, based on the input sound, an amplitude of a component of the input sound to be played by one of a set of speakers;
determining, based on the amplitude, an air column length for playback of the component;
selecting, based on the input sound and the air column length, a speaker of the set of speakers to emit the component;
controlling, based on the selected speakers and the air column lengths, an actuation state for each of a set of valves within speaker tubes to control a selected air column length of each of the selected speakers; and
causing the selected speakers to emit sound based on the input sound.

10. The method of claim 9, wherein the selecting is based further on locations of audio output holes distributed across a frame of the head mounted display device.

11. The method of claim 9, wherein:
the input sound includes directional information; and
the selecting is based further on the directional information and a frequency response of each of the set of speakers.

12. The method of claim 9, further comprising:
identifying a second device; and
receiving external sound data from a second device, wherein the input sound includes the external sound data.

13. The method of claim 12, further comprising determining a position of the second device, wherein the selecting is based further on the position of the second device.

14. The method of claim 12, further comprising:
providing, responsive to the identifying, a notification to a user of the head mounted display device; and receiving a user input, wherein the input sound including the external sound data is based on the user input.

15. A computer program product, the computer program product comprising a computer readable storage medium having program instructions embodied therewith, the program instructions executable by a computer to cause the computer to:

receive input sound to be played from a head mounted display device;

determine, based on the input sound, an amplitude of a component of the input sound to be played by one of a set of speakers;

determine, based on the amplitude, an air column length for playback of the component;

select, based on the input sound and the air column length, a speaker of the set of speakers to emit the component;

control, based on the selected speakers and the air column lengths, an actuation state for each of a set of valves within speaker tubes to control a selected air column length of each of the selected speakers; and cause the selected speakers to emit sound based on the input sound.

16. The computer program product of claim 15, wherein the selecting is based further on locations of audio output holes distributed across a frame of the head mounted display device.

17. The computer program product of claim 15, wherein:
the input sound includes directional information; and
the selecting is based further on the directional information and a frequency response of each of the set of speakers.

18. The computer program product of claim 15, wherein the instructions further cause the computer to:
identify a second device; and
receive external sound data from a second device, wherein the input sound includes the external sound data.

19. The computer program product of claim 15, wherein the instructions further cause the computer to determine a position of the second device, wherein the selecting is based further on the position of the second device.

20. The computer program product of claim 15, wherein the instructions further cause the computer to:
provide, responsive to the identifying, a notification to a user of the head mounted display device; and
receive a user input, wherein the input sound including the external sound data is based on the user input.

* * * * *